United States Patent
Bowman et al.

(10) Patent No.: US 12,308,776 B2
(45) Date of Patent: May 20, 2025

(54) MOTOR CONTROL CONTROLLER SYSTEM AND METHODS

(71) Applicant: ETA Green Power Limited, Hethel (GB)

(72) Inventors: Liam Bowman, Hethel (GB); Alistair Cheeseman, Hethel (GB)

(73) Assignee: ETA Green Power Limited, Hethel (GB)

( * ) Notice: Subject to any disclaimer, the term of this patent is extended or adjusted under 35 U.S.C. 154(b) by 203 days.

(21) Appl. No.: 18/205,467

(22) Filed: Jun. 2, 2023

(65) Prior Publication Data
US 2023/0402952 A1 Dec. 14, 2023

(30) Foreign Application Priority Data
Jun. 10, 2022 (GB) .................................... 2208546

(51) Int. Cl.
*H02P 3/00* (2006.01)
*H02J 7/00* (2006.01)
(Continued)

(52) U.S. Cl.
CPC .............. *H02P 27/08* (2013.01); *H02J 7/007* (2013.01); *H02M 7/797* (2013.01); *H02J 2207/20* (2020.01)

(58) Field of Classification Search
CPC .......... H02P 27/08; H02J 7/007; H02M 7/797
(Continued)

(56) References Cited

U.S. PATENT DOCUMENTS

| 6,118,678 A | 9/2000 | Limpaecher et al. |
| 2008/0304292 A1* | 12/2008 | Zeng ................ H02M 3/33584 363/21.01 |

(Continued)

FOREIGN PATENT DOCUMENTS

| CN | 203800857 U | 8/2014 |
| KR | 20100084439 A | 7/2010 |

OTHER PUBLICATIONS

Combined Search and Examination Report for Application No. GB2208546.8, dated Aug. 19, 2022, 7 pages.
(Continued)

*Primary Examiner* — Erick D Glass
(74) *Attorney, Agent, or Firm* — Barnes & Thornburg

(57) ABSTRACT

The present disclosure relates to an energy management system for a motor controller system for optimising power signals for different operating voltages of electrically commutated motors. The energy management system comprises a bi-directional energy converter comprising a first input/output terminal and a second input/output terminal, a first waveform controller, and a second waveform controller. The bi-directional energy converter is coupled to the first waveform controller and to the second waveform controller. The first waveform controller is coupled to the second input/output terminal and the second waveform controller is coupled to the first input/output terminal. The bi-directional energy converter is configured to receive a first input voltage at the first input/output terminal and generate a first output voltage in a first operating direction and receive a second input voltage at the second input/output terminal and generate a second output voltage in a second operating direction.

20 Claims, 8 Drawing Sheets

(51) Int. Cl.
　　　*H02M 7/797*　　　(2006.01)
　　　*H02P 5/00*　　　(2016.01)
　　　*H02P 27/08*　　　(2006.01)

(58) Field of Classification Search
　　　USPC ........................................................ 318/139
　　　See application file for complete search history.

(56) References Cited

U.S. PATENT DOCUMENTS

| | | |
|---|---|---|
| 2009/0051346 A1 | 2/2009 | Manabe et al. |
| 2013/0155736 A1* | 6/2013 | Ilic .......................... H02M 7/72 |
| | | 363/71 |
| 2014/0313784 A1* | 10/2014 | Strzalkowski .... H02M 3/33584 |
| | | 363/17 |
| 2016/0072400 A1 | 3/2016 | Alexander |
| 2017/0129364 A1* | 5/2017 | Cui ....................... B60L 15/002 |
| 2019/0269998 A1 | 9/2019 | Doerksen et al. |
| 2019/0280586 A1 | 9/2019 | Chen et al. |
| 2020/0358380 A1 | 11/2020 | Gabrys |

OTHER PUBLICATIONS

Extended European Search Report for Application No. 23177821.8-1202, dated Nov. 16, 2023, 9 pages.
Search Report for Application No. GB2208546.8, dated Oct. 12, 2022, 2 pages.
Examination Report for Application No. GB2208546.8, dated May 22, 2023, 3 pages.

* cited by examiner

MOTOR CONTROL CONTROLLER SYSTEM AND METHODS

CROSS REFERENCE TO RELATED APPLICATIONS

This application claims priority to and the benefit of GB Patent Application No. 2208546.8 dated 10 Jun. 2022, the disclosure of which is now expressly incorporated herein by reference.

FIELD OF THE INVENTION

The present invention relates to motor power control signals and systems. More particularly, but not exclusively, the present invention relates to an energy management system for a motor controller system for optimising power signals for different operating voltages of electrically commutated motors.

BACKGROUND

There has been a significant drive to make electric motors more compact and efficient. An electric motor comprises a stator and a rotor and can be put into two categories: a brushed motor and a brushless motor. In a brushed motor the stator may comprise permanent magnets and the rotor may comprise a coil assembly. When a current is passed through the coils of the rotor a magnetic field is generated causing a torque in the rotor that is tangential to the current flow in the coils. In order for the rotor to rotate in a constant direction the polarity of the generated magnetic field needs to be changed. This is achieved by brushes (commutators) which contact the rotor to manipulate the direction of current provided to the coils which in turn manipulates the polarity of the generated magnetic field.

In a brushless motor the stator comprises the coil windings and the rotor comprises the permanent magnets. In a typical brushless motor, the rotor may incorporate a four-pole permanent magnet. The stator, on the other hand, may consist of a three phased coil winding. A sensor magnet may be used to indicate the position of a rotor shaft and a controller is able to switch current to each winding at the optimum timing point. This way semiconductor switches turn the appropriate stator winding phase "on" and "off" at the appropriate time. The direction of current flow can be in either direction when a phase is "on". This process is called electronic commutation, borrowing on terminology used for the mechanism in dc motors, called a commutator, that switches current from winding to winding, forcing the rotor to turn.

A typical motor can operate in two modes—motoring and braking. It further comprises a motor drive configured to control the motor in both directions of rotation. In motoring mode, the machine converts the electrical energy from a source into mechanical energy, supporting its motion i.e. rotor rotation. In braking mode, the machine works as a generator and converts mechanical energy into electrical energy. The motor can work in both modes in both forward and reverse directions.

A motor drive controller can operate in the four quadrants of operation of the motor: forward braking 1054, forward motoring 1051, reverse motoring 1053 and reverse braking 1052, these quadrants are shown in FIG. 1. As will be understood the forward breaking 1054 and reverse braking 1052 quadrants are also referred to as forward regenerative breaking 1054 and reverse regenerative braking 1052. A motor drive capable of operating in all four quadrants, producing both motoring and regeneration, is called a Four Quadrant motor drive.

In an energy management system for an electric motor the voltage from a voltage source, for example a battery, may need to be stepped down to provide a lower starting torque to prevent an overcurrent in the coils of the motor due to the back emf. One common type of motor drive is the "chopper circuit" or "chopper drive" which steps down the voltage from the battery to the required operating voltage of the motor. This circuit operates in the forward motoring 1053 quadrant in FIG. 1. Once the rotor of the motor begins rotating, the voltage from the battery may then be used to provide a higher desired operating speed. At this point some chopper drives are designed such that they continue to step down the battery voltage to compensate for a drop in battery voltage level resulting from the battery being discharged i.e. if a fully charged battery pack is matched to a motor running at 3,000 rpm with no chopper drive, when the battery discharges e.g. from 48 to 40 volts the maximum attainable speed may drop to 2500 rpm. Most chopper drives are therefore designed such that the maximum motor speed requires a voltage just below the maximum battery voltage. In another example, the voltage from the battery may then be used to provide the higher desired operating speed, without being stepped down by the chopper drive.

In some cases however, the voltage may be stepped up in order to provide a high voltage required to drive each phase of the coil windings of the motor at a higher operating speed. This can be the case where the supply voltage is lower than the operating voltage of the motor.

It is well known that there is always a loss of power when a voltage level is changed from a first level to a second level, irrespective of whether it is an increase or decrease in voltage. This limits the efficiency achievable in the motor as the motor must be matched with a battery operating voltage which can lead to currents being over the operating range.

Another significant cause of inefficiency and loss of power is the fact that large current spikes may occur due to the switching functionality required to increase or decrease the voltage from the battery to meet the operating requirements of the motor. These can cause excess current spikes on the battery which increases battery temperature and reduces charge capacity of the battery overtime. This can be even more significant during the start-up of the motor as there is a large current required by the coil windings. The back emf induced causes a significant current ripple at the leading edge of the current supplied to each phase.

The present invention seeks to solve the above-mentioned problems.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In accordance with a first aspect of the invention, there is provided an energy management system for an electric motor, the management system comprising:
  a bi-directional energy converter comprising a first input/output terminal and a second input/output terminal;
  a first waveform controller; a second waveform controller;
  wherein the bi-directional energy converter is coupled to the first waveform controller and to the second waveform controller, wherein the first waveform controller is coupled to the second input/output terminal and wherein the second waveform controller is coupled to the first input/output terminal;

wherein the bi-directional energy converter is configured:
to receive a first input voltage at the first input/output terminal and generate a first output voltage in a first operating direction and receive a second input voltage at the second input/output terminal and generate a second output voltage in a second operating direction;
to operate in a primary mode and secondary mode wherein in the primary mode the bi-directional energy converter is configured to generate the output voltages from the input voltages wherein the output voltages are greater than the input voltages and wherein in the secondary mode the bi-directional energy converter is configured to generate the output voltages from the input voltages wherein the output voltages are less than the input voltages;

wherein in the first operating direction and in primary mode the first waveform controller is configured to modify the first output voltage waveform from the bi-directional energy converter to provide a first desired output voltage waveform at the second input/output terminal;

wherein in the second operating direction and in the primary mode the second waveform controller is configured to modify the second output voltage waveform from the bi-directional energy converter to provide a second desired output voltage waveform at the first input/output terminal.

The energy management system of the presently claimed advantageously operates bi-directionally and is capable of increasing or decreasing a voltage from an input voltage source and shaping the voltage at the output. The first and second waveform controllers filter the output current from the bi-directional energy converter to the second input/output terminal, for example a commutation circuit, and vice versa i.e. to the first input/output terminal dependent on the direction of operation, to match the back emf profile of the motor. For example, in the first operating direction the first waveform controller filters the first output voltage from the bi-directional energy converter to match the back emf profile of a motor at the second input/output terminal. This allows for a reduction of the peak current in the system and therefore reduces the internal I²R losses in the power supply in order to maximize the efficiency of the power supplied at the input. In addition, this reduction in current spikes in the voltage source can reduce the operational temperature of the voltage source thus prolonging its life. For example, a bi-directional energy converter increases an input voltage at the first input/output terminal from a voltage source, e.g. a battery, to the required operating voltage of the electric motor at the second input/output terminal. The first or second waveform controller shapes the output voltage waveform to match the back emf profile of the motor such that the current provided to each phase by the polyphase commutation circuit has a reduced current ripple thus reducing the internal temperature of the battery and also reducing the I²R losses. This maximises the efficiency of the power supplied by the battery. The energy management system therefore allows a battery at a set operating voltage to be used efficiently with electric motors that require a range of different operating voltages.

In some examples, in the first operating direction and in the secondary mode, the second waveform controller is configured to modify the first output voltage waveform from the bi-directional energy converter to provide the first desired output voltage waveform at the first input/output terminal, and in the second operating direction and in the secondary mode the first waveform controller is configured to modify the second output voltage waveform from the bi-directional energy converter to provide the second desired output voltage waveform at the second input/output terminal.

In some examples, the energy management system further comprises a battery coupled to the first input/output terminal and the second waveform controller, wherein in the first operating direction the battery is configured to provide the first input voltage to the bi-directional energy converter, and wherein in the second operating direction the battery is configured to receive the second desired output waveform.

In some examples, the energy management system further comprises a polyphase commutation circuit coupled to the second input/output terminal configured to comprise a plurality of output ports equal to the number of phases of a polyphase motor, wherein in the second operating direction the polyphase circuit is configured to provide the second input voltage to the bi-directional energy converter, and wherein in the first operating direction the polyphase commutation circuit is configured to receive the first desired output waveform.

In some examples, the bi-directional energy converter is configured to operate in either the primary mode or the secondary mode based, at least in part, on a voltage level provided at the first input/output terminal of the bi-directional converter. For example, a battery at the first input/output terminal may supply 110V however the operating voltage of the electric motor at the second input/output terminal may be 60V therefore the voltage from the battery is decreased to the operating voltage of the electric motor.

In some examples, the bi-directional energy converter is configured to operate in either the primary mode or secondary mode based, at least in part, on a voltage provided by the electric motor. For example, the motor may be operating in the forward regenerative braking quadrant 1054 and may be generating a voltage that is greater than the battery voltage level therefore the voltage from the battery may be stepped up to the generated voltage level which allows for more efficient charging of the battery.

In some examples, the first waveform controller is configured to modify the first output voltage waveform from the bi-directional energy converter based, at least in part, on whether the bi-directional energy converter is operating in either the first or second direction. In some examples, the first waveform controller is configured to modify the first output voltage based on the voltage level at the first input/output terminal compared to the voltage level at the second input/output terminal. In some examples, the second waveform controller is configured to modify the second output voltage waveform from the bi-directional energy converter based, at least in part, on whether the bi-directional energy converter is operating in either the first direction or the second direction. In some examples, the second waveform controller is configured to modify the second output voltage based on the voltage level of the first input/output terminal compared to the voltage level the second input/output terminal.

In accordance with a second aspect of the invention there is provided a charging system for charging a battery coupled to an electric motor, the system comprising:
a bi-directional energy converter configured to operate in a first operating direction and a second operating direction wherein the bi-directional energy converter is coupled to a first waveform controller and to a second waveform controller; and, wherein in the first operating direction the bi-directional energy converter is configured to receive a first input voltage from said battery and generate a first output voltage;

wherein in a second operating direction the bi-directional energy converter is configured to receive a second input voltage from said electric motor and generate a second output voltage;

wherein the bi-directional energy converter is configured to either increase or decrease the first and second output voltages relative to the first and second input voltages; and wherein the first waveform controller is configured to modify the first output voltage waveform from the bi-directional energy converter to provide a first desired output voltage waveform and wherein the second waveform controller is configured to modify the second output voltage waveform from the bi-directional energy converter to provide a second desired output voltage waveform.

In some examples, the first waveform controller is configured to modify the first output voltage based on a comparison of the voltage level of said battery to the voltage level of the electric motor. In some examples, the second waveform controller is configured to modify the second output voltage based on a comparison of the voltage level of the battery to the voltage level of the electric motor. In some examples, the first and second waveform controllers are configured to modify the output voltages from the bi-directional energy converter by filtering the output current of the bi-directional energy converter to match the back emf profile of the motor.

In accordance with a third aspect of the invention there is provided a four quadrant motor drive controller for an electric motor comprising:

a bi-directional energy converter couplable to: a power supply and an electric motor;

a first waveform controller; a second waveform controller;

wherein the bi-directional energy converter is coupled to the first waveform controller and to the second waveform controller, wherein the first waveform controller is couplable to an electric motor and wherein the second waveform controller is couplable to a power supply;

wherein the bi-directional energy converter is configured:

to receive a first input voltage and generate a first output voltage in a first operating direction and receive a second input voltage and generate a second output voltage in a second operating direction;

to operate in a primary mode and secondary mode wherein in the primary mode the bi-directional energy converter is configured to generate the output voltages from the input voltages wherein the output voltages are greater than the input voltages and wherein in the secondary mode the bi-directional energy converter is configured to generate the output voltages from the input voltages wherein the output voltages are less than the input voltages;

wherein in the first operating direction the first waveform controller is configured to modify the first output voltage waveform from the bi-directional energy converter to provide a first desired output voltage waveform;

wherein in the second operating direction the second waveform controller is configured to modify the second output voltage waveform from the bi-directional energy converter to provide a second desired output voltage waveform.

In some examples, in the first operating direction and in the secondary mode, the second waveform controller is configured to modify the first output voltage waveform from the bi-directional energy converter to provide the first desired output voltage waveform at the first input/output terminal, and wherein in the second operating direction and in the secondary mode the first waveform controller is configured to modify the second output voltage waveform from the bi-directional energy converter to provide the second desired output voltage waveform at the second input/output terminal.

In some examples, the motor drive controller is further configured to determine a torque demand of the motor and the bi-directional energy converter is configured to operate in either the primary mode or the secondary mode in response to the torque demand of the electric motor. The motor drive controller may be configured to determine a torque demand required of the system and manage the quadrant of operation of the electric motor to deliver energy to and from the motor in response to the determined torque demand reaching a selected torque demand threshold. For example, the motor operating at constant speed may experience a load which initially reduces the speed due to the increased torque demand of the motor. The motor drive controller may then provide more power from the power supply, e.g. a battery, to the motor i.e. increase the voltage supplied in order to maintain the constant speed of the motor with the load.

The relationship between the power, (P), delivered by the motor and the rotational speed (w) at which this torque (T) is delivered is given by Equation 1 below.

$$P = T \cdot \omega \qquad (1)$$

In some examples, the motor controller is configured to determine a torque demand based on a sensor coupled to the motor drive controller. In some examples the motor controller is configured to determine whether to operate in the primary mode or secondary mode based on a determination of the state of charge of the power supply coupled to the motor drive controller to power the electric motor. For example, if a fully charged battery pack is matched to a motor running at 3,000 rpm, when the battery discharges e.g. from 48 to 40 volts the motor drive controller may "boost" the voltage from the battery in order to maintain the 3000 rpm speed.

In some examples, the bi-directional energy converter is configured to operate in either the first operating direction or the second operating direction based on the current motor operation quadrant. In some examples, the bi-directional energy converter is configured to operate in either the first operating direction or the second operating direction based on the desired motor operation quadrant.

In some examples, the first waveform controller is configured to modify the first output voltage waveform from the bi-directional energy converter based, at least in part, on whether the bi-directional energy converter is operating in either the first direction or second direction. In some examples, the second waveform controller is configured to modify the second output voltage waveform from the bi-directional energy converter based, at least in part, on whether the bi-directional energy converter is operating in either the first direction or second direction. In some examples, the first and second waveform controllers are configured to modify the output voltages from the bi-directional energy converter by filtering the output current of the bi-directional energy converter to match the back emf profile of the motor.

In accordance with a fourth aspect of the invention there is provided a method of operating a motor coupled to an energy management system, wherein a rotor of the motor is either (i) stationary (ii) accelerating or rotating at constant speed or (iii) decelerating, the method comprising:

in response to determining that the rotor is stationary:
reducing a supply voltage and modifying the supply voltage waveform to the motor to achieve a starting torque or a required starting speed of rotation of the rotor of the motor;
determining that a back emf from the motor is at a certain threshold and increasing and modifying the voltage waveform of the supply voltage to the motor to achieve a desired operating torque or operating speed of rotation of the rotor;

in response to an increased torque demand or required rotor speed:
increasing and modifying the voltage waveform of the supply voltage to the motor to achieve a desired torque or a required speed of rotation of the rotor of the motor;

in response to determining that the rotor is decelerating:
comparing a voltage generated from the motor to the supply voltage;
determining whether to increase or decrease the supply voltage based on the comparison.

BRIEF DESCRIPTION OF DRAWINGS

Embodiments of the disclosure will now be described, by way of example only, with reference to the accompanying drawings, in which.

DETAILED DESCRIPTION

Some embodiments of the claims relate to an energy management system for a motor controller system for optimising power signals for different operating voltages of electric motors. In particular, embodiments of the claims relate to an energy management system for a polyphase electrically commutated motor that manipulates the voltage waveform of a voltage source so as to provide either a "boosted" or "bucked" variable output voltage. As a result, the energy system can provide the required operating voltage for a range of different electric motors while increasing the power efficiency of the voltage source.

Figure 1:
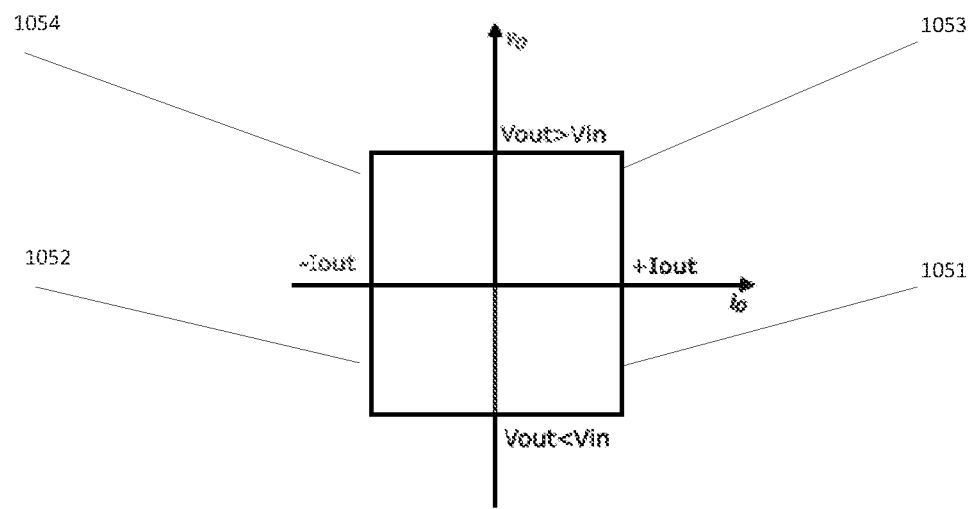
FIG. 1 shows a graph of the four quadrants of a motor.
Figure 2:
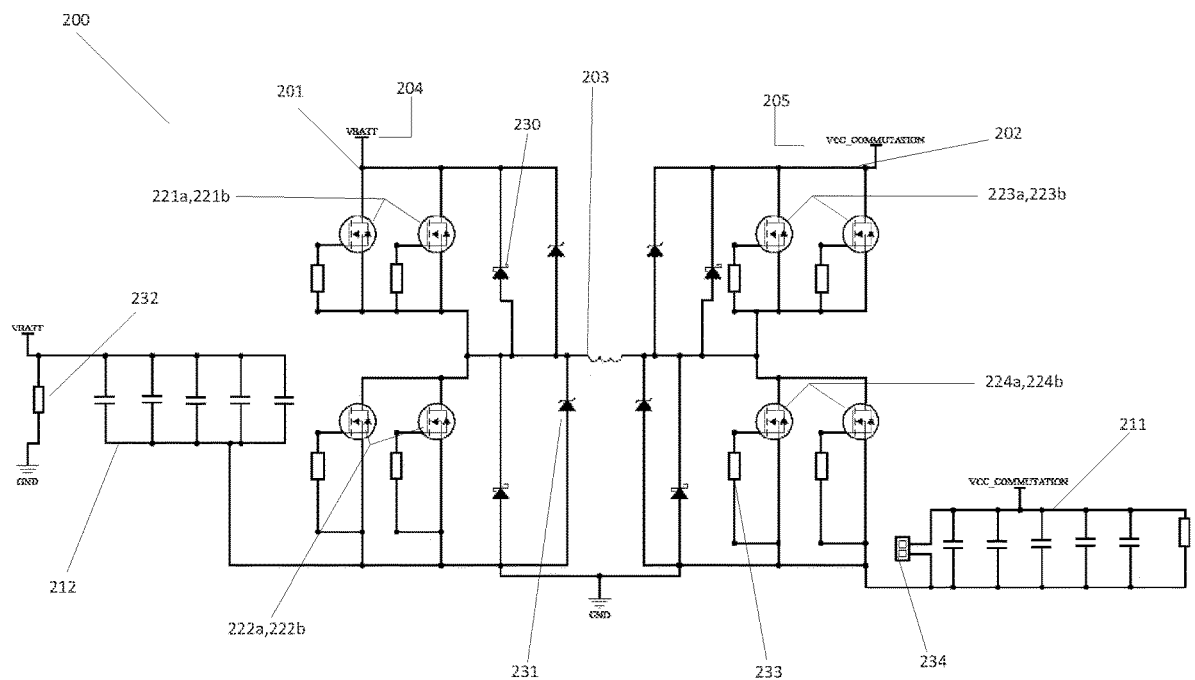
FIG. 2 shows an exemplary energy management system comprising a bi-directional energy converter circuit.

FIG. 2 shows an exemplary energy management system 200 comprising a bi-directional energy converter, for example a buck/boost converter coupled to a first waveform controller 211 and a second waveform controller 212. The energy management system 200 may comprise a battery 204 connected to a first input/output terminal 201 and ground of the bi-directional energy converter, a polyphase commutation circuit 205 connected to a second input/output terminal 202 and ground of the bi-directional energy converter, an inductor 203, a first and a second switching MOSFET pair 221a, 221b, 222a, 222b coupled to the first input/output terminal 201 on a first side of the inductor 203 and a third and fourth switching MOSFET pair 223a, 223b, 224a, 224b coupled to the second input/output terminal 202 on a second side of the inductor 203.

In some embodiments the bi-directional energy converter of the energy management system 200 may further comprise Schottky diode 230 coupled to the MOSFET pair to allow for some of the internal MOSFET current to flow through the Schottky diode instead of through the internal body diode of the MOSFET. In some embodiments the MOSFET pairs may comprise an internal body diode. The use of a Schottky diode may increase the efficiency of the MOSFET and improve the reverse recovery characteristics of a MOSFET's body diode. In some embodiments the bi-directional energy converter further comprises TVS diodes 231. The TVS diode may protect the MOSFETs from any additional electrical stresses caused by transient voltages in the circuit. In some embodiments, the energy management system 200 comprises resistor 232, that functions to drain the current stored in the capacitors of the first 211 or second waveform controller 212. In some embodiments, the bi-directional energy converter of the energy management system 200 comprises resistor 233 to aide in draining the charge stored in the MOSFET pairs 221a-224b.

Although FIG. 2 shows the bi-directional energy converter circuit for the energy management system 200 as comprising TVS diodes 231 and Schottky diodes 230 it will be understood that other means of providing this functionality is possible through other suitable electronic components. In some examples an appropriate selection of MOSFETs may address the above describe problems. For example, through the use of a MOSFET with an additional internal body diode, a high voltage regulated MOSFET, i.e. a silicon carbide FET, or a combination of the two.

The first and second switching MOSFET pairs 221a-222b are coupled to the battery 204 and the second waveform controller 212. The third and fourth switching transistor pairs 223a-224b are coupled to the polyphase commutation circuit 205 and the first waveform controller 211.

The first, second, third and fourth transistor switching pairs 221a-224b are MOSFETs comprising a bleed resistor 233 at the gate terminal wherein the MOSFET transistors are configured to be intermittently switched on and off using a control signal, for example a pulse width modulation control signal at its gate (not shown). The first waveform controller 211 is a bank of capacitors coupled to the battery 204 and the first and second transistor switching pairs 221a-222b. The second waveform controller 212 is a bank of capacitors coupled to the third and fourth switching transistor pairs 223a-224b and the commutation circuitry. The first and second waveform controllers 211, 212 can therefore operate as input filters or output filters depending on the direction of operation. This advantageously smooths out the input current, thereby reducing the current ripple at the leading edge of the output of the bi-directional converter in either direction. The low equivalent series resistance of the capacitors advantageously do not significantly affect the operation of the circuit. Although the first and second waveform controllers 211, 212 have been described comprising a bank of capacitors, it would be understood that a single capacitor with an equivalent capacitance would also function in the present configuration. Furthermore, other active or passive electronic components would provide similar functionality, such as a switching PFC circuit or a partial switching PFC circuit.

Figure 3:
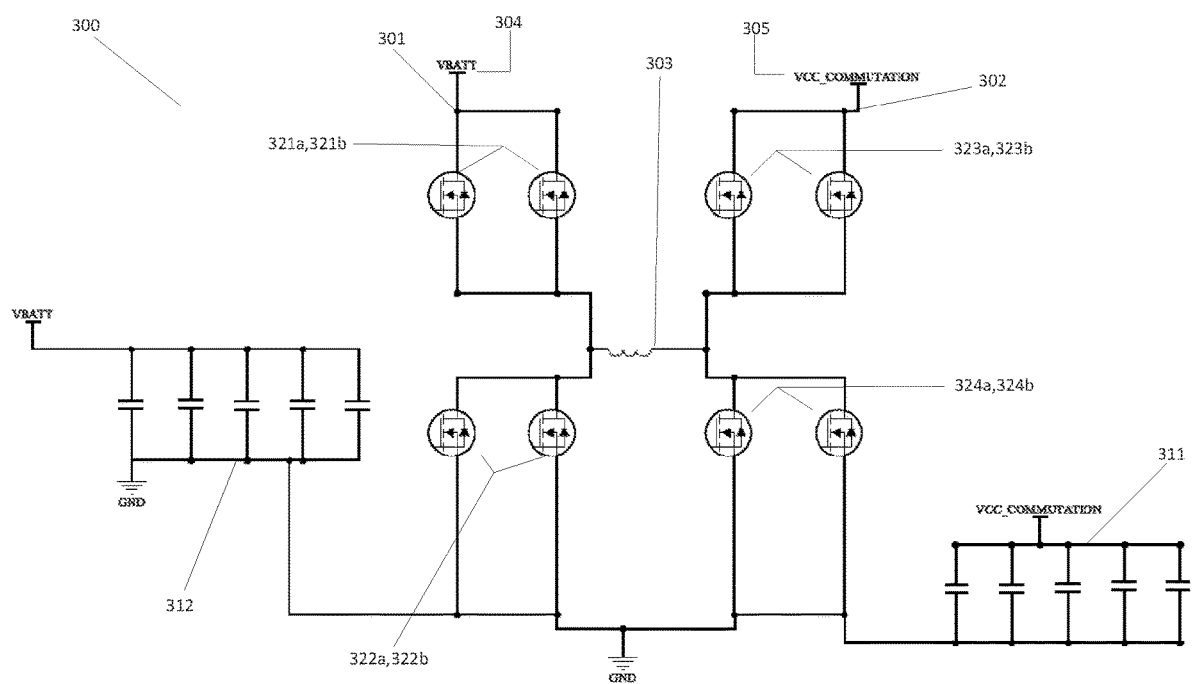
FIG. 3 shows an exemplary energy management system comprising a bi-directional energy converter circuit.

FIG. 3 shows an exemplary energy management system 300 in which the bi-directional energy converter is configured to have: a first operating direction, where energy is transferred from the first input/output terminal 301 connected to the battery 304 to the polyphase commutation circuit 305 connected at the second input/output terminal 302; and a second operating direction, where energy is transferred from the polyphase commutation circuit 305 to the battery 304. Thus the energy management system 300 is able to receive an input voltage at either the first input/output terminal 301 or the second input/output terminal 302 depending on the desired operation and/or operating direction. For example, in the first operating direction the bi-directional energy converter of the energy management system 300 is configured to receive an input voltage from the battery 304 and generate an output voltage which is provided to the polyphase commutation circuit 305.

The bi-directional energy converter of the energy management system 300 is further configured to operate in either a primary mode or a secondary mode where in the primary mode the bi-directional energy converter is configured to convert an input voltage at either the first or second input/output terminal 301, 302, depending on the operating direction, to an output voltage wherein the output voltage is greater than the input voltage i.e. function as a "boost" converter. In the secondary mode the bi-directional energy converter 300 is configured to convert an input voltage at either the first or second input/output terminal 301, 302, depending on the operating direction, to an output voltage wherein the output voltage is less than the input voltage.

In some embodiments, the bi-directional energy converter is configured to operate in either the primary mode or the secondary mode based on a comparison between the provided input voltage, at either the first input/output terminal 301 or the second input/output terminal 302 depending on the operating direction, to the voltage requirements at the output terminal, i.e. either the first input/output terminal 301 or the second input/output terminal 302. For example, in the case where the bi-directional energy converter of the energy management system 300 is operating in the first direction and a battery 304 is connected to the first input/output terminal 301, the battery 304 may supply 110V however the required operating voltage of an electric motor coupled to the polyphase commutation circuit 305 connected to the second input/output terminal 302 may only be 60V therefore the voltage from the battery 304 at the first input/output terminal 301 is decreased to the operating voltage of the electric motor at the second input/output terminal 302. The same is true for the bi-directional energy converter of the energy management system 300 operating in the opposite direction. For example, in the case where the bi-directional energy converter is operating in the second direction, the polyphase commutation circuit 305 at the second input/output terminal 302 provides the input voltage and the battery 304 connected at the first input/output terminal 301 is configured to receive the resulting output voltage from the bi-directional energy converter. In this example, the bi-directional energy converter receives an input voltage from a polyphase electric motor (not shown) connected to the polyphase commutation circuit 305 which may provide a charging voltage to the battery 304 depending on the current voltage level of the battery 304.

Although the working example shown in FIGS. 2 and 3 have been described with the provision of a battery 304 connected at the first input/output terminal 301 of the energy management system 300 and a polyphase commutation circuit 305 connected at the second input/output terminal 302 it will be understood that other configurations are possible. For example, other voltage sources may be used at the first input/output terminal 301, such as a connection to the mains power supply. In another example, the second input/output terminal 302 is coupled to a DC motor.

As is described in relation to FIGS. 4a-4d the direction of energy transfer and whether the bi-directional energy converter is operating in the buck or boost mode is controlled by the state of the switching pair transistors 421a-424b.

FIGS. 4a-4d show a bi-directional energy converter of an energy management system 400 operating in a primary mode or secondary mode where the pairs of switching transistors 421a-424b control the direction of energy transfer as well as whether an input voltage is increased, i.e. the bi-directional energy converter is operating in the primary mode, or decreased, i.e. the bi-directional energy converter is operating in the secondary mode.

Figure 4A:
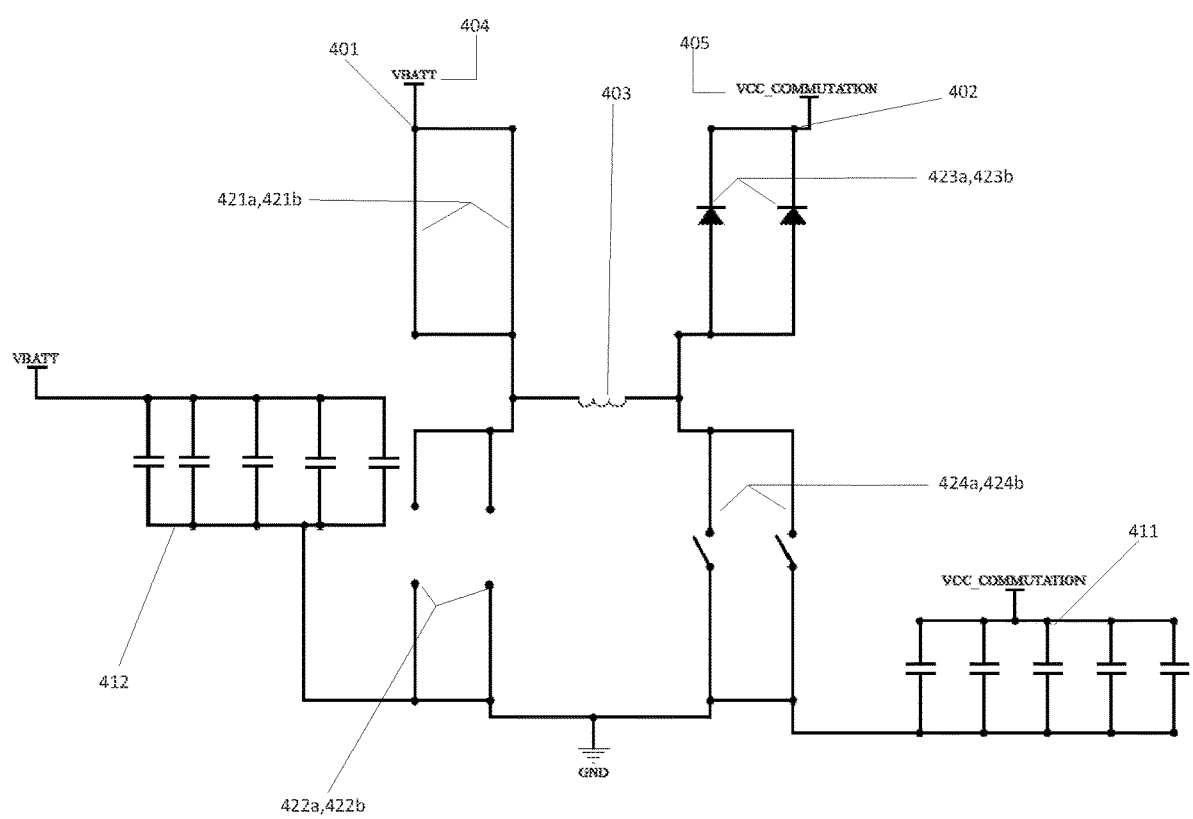
FIG. 4a shows a working example of the bi-directional energy converter.

FIG. 4a shows an embodiment where the voltage from the battery is increased i.e. the voltage from the battery 404 is less than the voltage required by the polyphase commutation circuit 405. The first switching transistor pair 421a,421b is in the "ON" state, i.e. can be modelled as a conducting wire or a switch in the closed state while the second switching transistor pair 422a, 422b is in the "OFF" state, i.e. can be modelled as an open circuit or a switch in the opened state therefore the second waveform controller 412 does not affect the function of the bi-directional energy converter. The third switching transistor pair 423a, 423b is in the rectifying state i.e. can be modelled as a diode to perform the rectifying operation. The fourth switching transistor pair 424a, 424b is in a switching state, i.e. can be modelled as a switching circuit, switching from an "ON" state to an "OFF" state. The rate that the fourth transistor pair 424a, 424b is switched is controlled by a signal at the gate of the fourth transistor 424a, 424b, for example, a PWM signal. This switching controls the amount that the voltage is being stepped-up to as well as whether the bi-directional energy converter is operating as a step-up converter or a step-down converter. In this example the bi-directional energy converter will increase i.e. "boost" the voltage from the battery 404 to the voltage level of the polyphase commutation circuit 405.

The first waveform controller 411 modifies the boosted output voltage waveform from the bi-directional energy converter prior to being input into the polyphase commutation circuit 405. In this example, the second waveform controller 412 does not affect the output voltage produced at the right-hand side of the inductor 403 coupled to the third and fourth switching transistor pairs 423a-424b. Thus in this configuration the first waveform controller 411 is configured to modify the output voltage from the bi-directional energy converter 400 without interference from the second waveform controller 412.

Figure 4B:
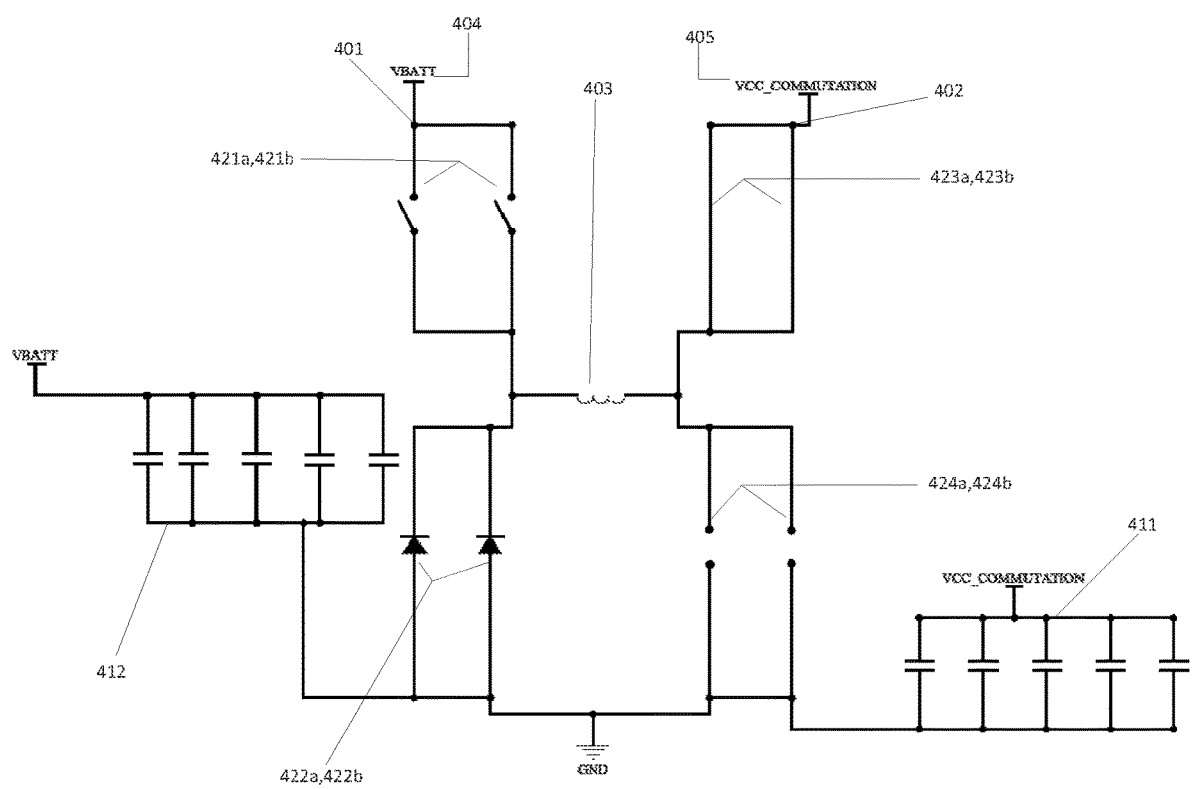
FIG. 4b shows a working example of the bi-directional energy converter.

FIG. 4b shows an embodiment where the voltage from the battery is decreased i.e. the voltage from the battery 404 is greater than the voltage required by the polyphase commutation circuit 405. In some embodiments this is to provide a starting torque for the motor that does not result in an overcurrent in the coils of the motor. The first switching transistor pair 421a,421b is in the switching state, i.e. can be modelled as a switching circuit, switching from an "ON" state to an "OFF" state while the second switching transistor pair 422a, 422b is in the rectifying state i.e. can be modelled as a diode to perform the rectifying operation. The third switching transistor pair 423a, 423b is in the "ON" state i.e. can be modelled as a conducting wire or a switch in the closed state. The fourth switching transistor pair 424a, 424b is in the "OFF" state, i.e. can be modelled as an open circuit or a switch in the opened state therefore the first waveform controller 411 does not affect the function of the bi-directional energy converter. The rate that the first transistor pair 421a, 421b is switched is controlled by a signal at the gate of the first transistor 421a, 421b, for example, a PWM signal. This switching controls the amount of voltage that the voltage is being stepped down as well as whether the bi-directional energy converter 400 is operating as a step-up converter or a step-down converter. In this example the bi-directional energy converter 400 will decrease i.e. "buck" the voltage from the battery 404 to the voltage level the polyphase commutation circuit 405.

The second waveform controller 412 modifies the bucked output voltage waveform from the bi-directional energy converter 400 prior to being input into the polyphase commutation circuit 405. In this example, the first waveform controller 411 does not affect the output voltage produced at the left-hand side of the inductor 403 coupled to the third and fourth switching transistor pairs 423a-424b. Thus in this configuration the second waveform controller 412 is configured to modify the output voltage from the bi-directional energy converter 400 without interference from the first waveform controller 411.

Figure 4C:
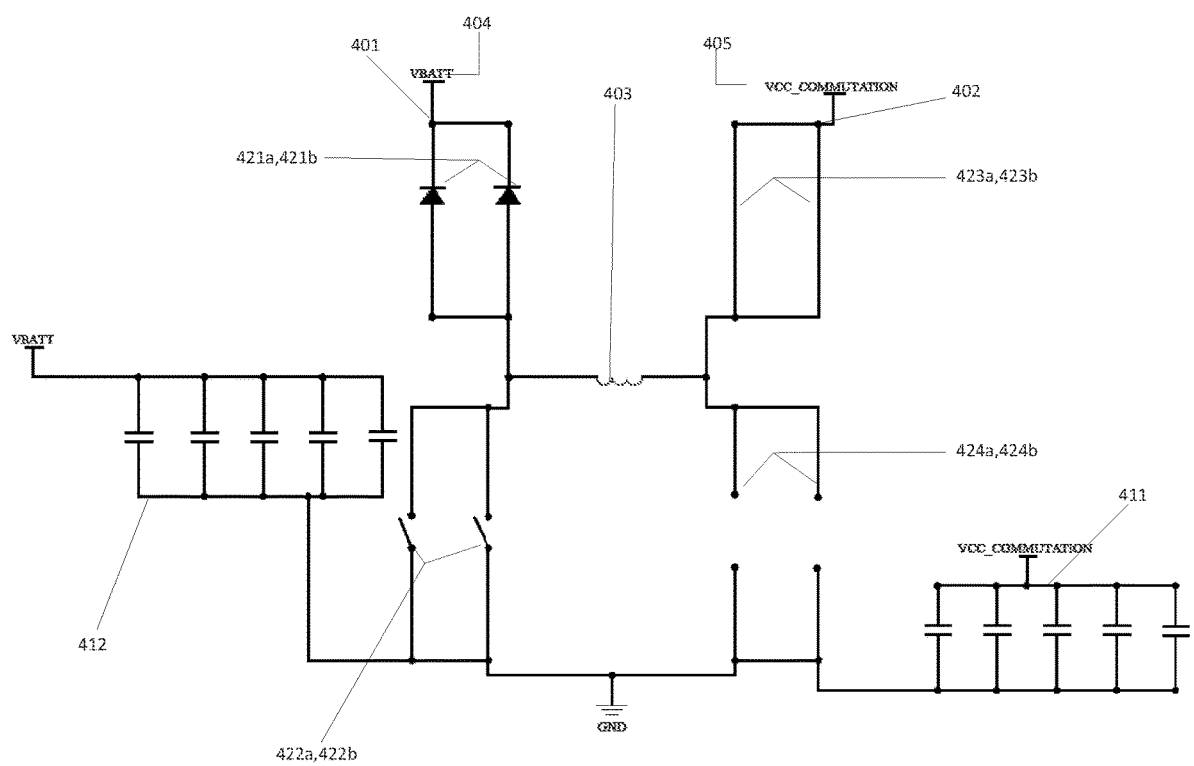
FIG. 4c shows a working example of the bi-directional energy converter.

FIG. 4c shows an embodiment where the voltage from the polyphase commutation circuit is increased to the voltage level of the battery i.e. the polyphase commutation circuit 405 voltage is less than the voltage of the battery 404. The third switching transistor pair 423a,423b is in the "ON" state, i.e. can be modelled as a conducting wire or a switch in the closed state while the fourth switching transistor pair 424a, 424b is in the "OFF" state, i.e. can be modelled as an open circuit or a switch in the opened state therefore the first waveform controller 411 does not affect the function of the bi-directional energy converter. The first switching transistor pair 421a, 421b is in the rectifying state i.e. can be modelled as a diode to perform the rectifying operation. The second switching transistor pair 422a, 422b is in a switching state, i.e. can be modelled as a switching circuit. The rate that the second switching transistor pair is switched "ON" and "OFF" is controlled by a signal at the gate terminal of the second switching transistor pair 422a, 422b, for example, a PWM signal. This switching controls whether the converter is operating as a step-up converter or a step-down converter. In this example the bi-directional energy converter will increase i.e. boost the voltage from the polyphase commutation circuit 405 to the voltage level of the battery. The second waveform controller 412 modifies the boosted output voltage waveform from the bi-directional energy converter 400 prior to being inputted to the battery to charge the battery. In this example, the first waveform controller 411 does not affect the output voltage produced at the first and second switching transistor pairs 421a-422b from the inductor 403 of the bi-directional energy converter. Thus in this configuration the second waveform controller 412 is configured to modify the output voltage from the bi-directional energy converter without interference from the first waveform controller 411. Advantageously, the output voltage from the bi-directional converter of the energy management system 400 is either increased or decreased and modified to filter out any high frequency signals that may degrade the charging capability of the battery.

Figure 4D:
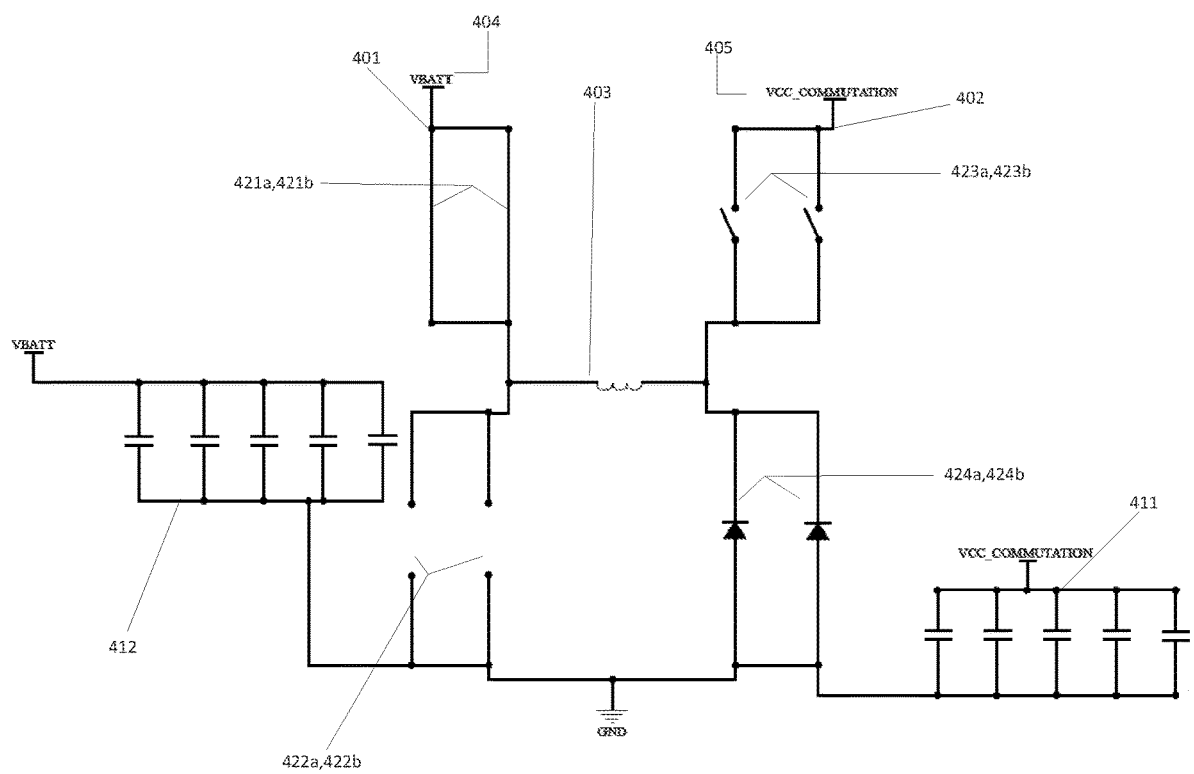
FIG. 4d shows a working example of the bi-directional energy converter.

FIG. 4d shows an embodiment where the voltage from the polyphase commutation circuit is decreased to the voltage of the battery i.e. the voltage from the polyphase commutation circuit 405 is greater than the voltage required by the battery 404. The first switching transistor pair 421a,421b is in the "ON" state, i.e. can be modelled as a conducting wire or a switch in the closed state while the second switching transistor pair 422a, 422b is in the "OFF" state, i.e. can be modelled as an open circuit or a switch in the opened state therefore the second waveform controller 412 does not affect the function of the bi-directional energy converter. The third switching transistor pair 423a, 423b is in a switching state, i.e. can be modelled as a switching circuit, switching from an "ON" state to an "OFF" state. The fourth switching transistor pair 424a, 424b is in the rectifying state i.e. can be modelled as a diode to perform the rectifying operation. The rate that the third transistor pair 424a, 424b is switched is controlled by a signal at the gate of the third transistor 424a, 424b, for example, a PWM signal. This switching controls the amount that the voltage is being stepped-up to as well as whether the bi-directional energy converter is operating as a step-up converter or a step-down converter. In this example the bi-directional energy converter 400 will decrease i.e. "buck" the voltage from the battery 404 to the voltage level from the polyphase commutation circuit 405.

The first waveform controller 411 modifies the bucked output voltage waveform from the bi-directional energy converter 400 prior to being input into the polyphase commutation circuit 405. In this example, the second waveform controller 412 does not affect the output voltage produced at the right-hand side of the inductor 403 coupled to the third and fourth switching transistor pairs 423a-424b. Thus in this configuration the first waveform controller 411 is configured to modify the output voltage from the bi-directional energy converter 400 without interference from the second waveform controller 412.

Advantageously, the output voltages from the bi-directional converter are either increased or decreased and modified to filter out any high frequency signals that would otherwise be inducing losses in the motor. This is achieved both when the energy is being transferred to the battery 404 from the polyphase commutation circuit 405 and vice versa. The modified voltage provided to the commutation electronics 405 from the bi-directional energy converter 400 is a half sine wave which further reduces peak current used in energising each commutation stage as shown in FIG. 5.

Figure 5:
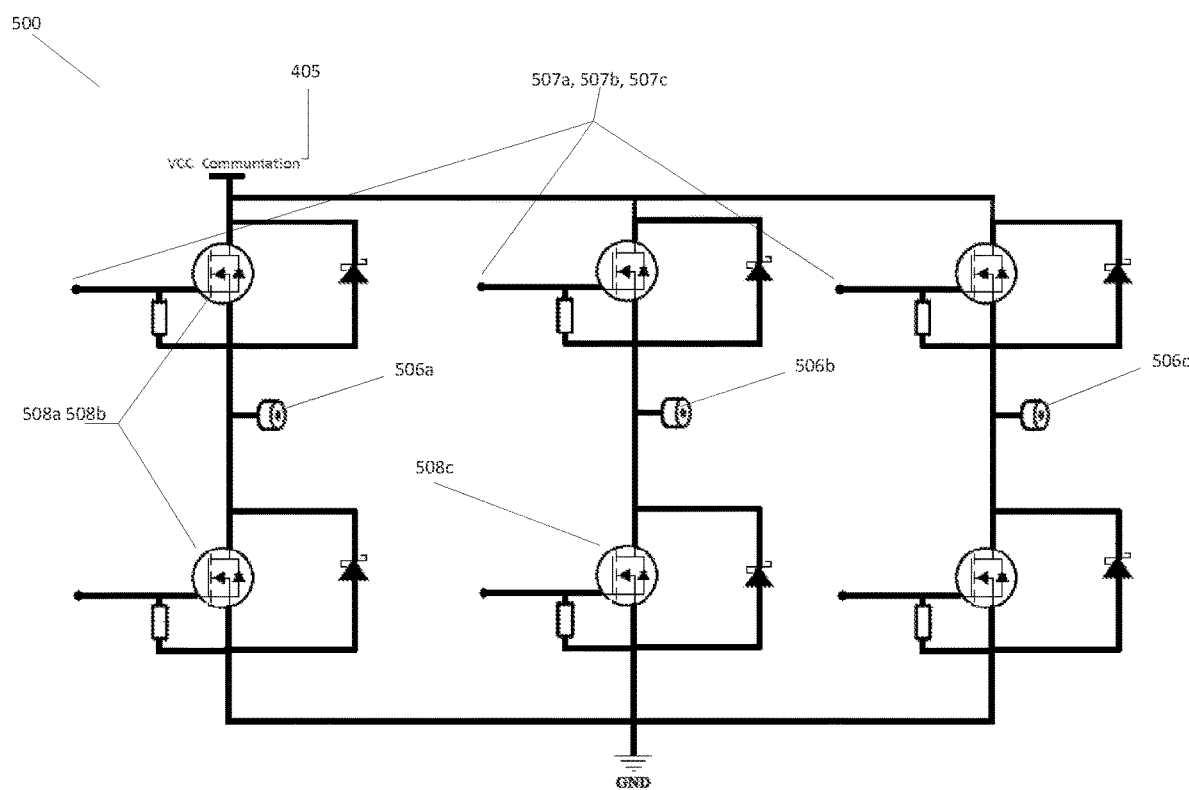
FIG. 5 shows an exemplary polyphase commutation circuit.

FIG. 5 shows the commutation electronics circuitry 500 of the polyphase communication circuit 505 couplable to the second terminal 202 of the bi-directional energy converter. Each transistor 508n is coupled to a motor phase 506a, 506b, 506c. The signal at the gate terminal 507n of the transistors 508n control whether the transistor is in a "ON" or "OFF" state. The state of each transistor controls when each phase 506a, 506b, 506c is energised. The transistors shown are MOSFETs however other switching elements maybe used, for example, bipolar transistors.

In this example, the modified output voltage waveform from the bi-directional energy converter via the first waveform controller 211 is commutated to each phase of the motor. For example, the first transistor 508a is "ON", the second transistor 508b is "OFF" and the third transistor 508c is "ON". The voltage is provided to a first phase of the motor 506a and returned to ground through the second phase of the motor 506b via the third transistor 508c. Normally the voltage supplied to each motor phase is a DC voltage but in this way the polyphase commutation circuit 505 further reduces peak current present in the energy management system 200 comprising the bi-directional energy converter by producing a half sine wave and functions similar to a halfwave rectifier. Although the working examples have been described in the context of MOSFETS, it would be understood by the skilled person that other switching elements may also be used with the use of an appropriate configuration to achieve the desired operation. In the context of the present disclosure other examples and variations of the systems described herein will be apparent to a person of skill in the art. It will be appreciated from the discussion above that the embodiments shown in the Figures are merely exemplary, and include features which may be generalised, removed or replaced as described herein and as set out in the claims.

The invention claimed is:

1. An energy management system for an electric motor, the energy management system comprising:
    a bi-directional energy converter comprising a first input/output terminal and a second input/output terminal;
    a first waveform controller; a second waveform controller;
    wherein the bi-directional energy converter is coupled to the first waveform controller and to the second waveform controller, wherein the first waveform controller is coupled to the second input/output terminal and wherein the second waveform controller is coupled to the first input/output terminal;
    wherein the bi-directional energy converter is configured:
        to receive a first input voltage at the first input/output terminal and generate a first output voltage in a first operating direction and receive a second input voltage at the second input/output terminal and generate a second output voltage in a second operating direction;
        to operate in a primary mode and secondary mode wherein in the primary mode the bi-directional energy converter is configured to generate the output voltages from the input voltages wherein the output voltages are greater than the input voltages and wherein in the secondary mode the bi-directional energy converter is configured to generate the output voltages from the input voltages wherein the output voltages are less than the input voltages;
    wherein in the first operating direction and in the primary mode the first waveform controller is configured to modify the first output voltage waveform from the bi-directional energy converter to provide a first desired output voltage waveform at the second input/output terminal;
    wherein in the second operating direction and in primary mode the second waveform controller is configured to modify the second output voltage waveform from the bi-directional energy converter to provide a second desired output voltage waveform at the first input/output terminal.

2. The energy management system of claim 1, wherein in the first operating direction and in the secondary mode, the second waveform controller is configured to modify the first output voltage waveform from the bi-directional energy converter to provide the first desired output voltage waveform at the first input/output terminal, and
    wherein in the second operating direction and in the secondary mode the first waveform controller is configured to modify the second output voltage waveform from the bi-directional energy converter to provide the second desired output voltage waveform at the second input/output terminal.

3. The energy management system of claim 1, wherein the first and second waveform controllers are configured to modify the output voltages from the bi-directional energy converter by filtering the output current of the bi-directional energy converter to match the back emf profile of the motor.

4. The energy management system of claim 1, further comprising a battery coupled to the first input/output terminal and the second waveform controller, wherein in the first operating direction the battery is configured to provide the first input voltage to the bi-directional energy converter, and wherein in the second operating direction the battery is configured to receive the second desired output waveform.

5. The energy management system of claim 1 further comprising a polyphase commutation circuit coupled to the second input/output terminal configured to comprise a plurality of output ports equal to a number of phases of a polyphase motor, wherein in the second operating direction the polyphase circuit is configured to provide the second input voltage to the bi-directional energy converter, and wherein in the first operating direction the polyphase commutation circuit is configured to receive the first desired output waveform.

6. The energy management system of claim 1, wherein the bi-directional energy converter is configured to operate in the primary mode or the secondary mode based, at least in part, on a voltage level provided at the first input/output terminal of the bi-directional energy converter.

7. The energy management system of claim 1, wherein the bi-directional energy converter is configured to operate in either the primary mode or secondary mode based, at least in part, on a voltage level provided at the second input/output terminal.

8. The energy management system of claim 1 wherein:
    the first waveform controller is configured to modify the first output voltage waveform from the bi-directional energy converter based, at least in part, on whether the bi-directional energy converter is operating in either the first direction or second direction; and
    the second waveform controller is configured to modify the second output voltage waveform from the bi-directional energy converter based, at least in part, on whether the bi-directional energy converter is operating in either the first direction or second direction.

9. The energy management system of claim 1 wherein the first waveform controller is configured to modify the first output voltage based on a comparison of the voltage level at the first input/output terminal to the voltage level provided at the second input/output terminal.

10. The energy management system of claim 1 wherein the second waveform controller is configured to modify the second output voltage based on a comparison of the voltage level at the first input/output terminal to the voltage level provided at the second input/output terminal.

11. A charging system for charging a battery coupled to an electric motor, the system comprising:
    a bi-directional energy converter configured to operate in a first operating direction and a second operating direction wherein the bi-directional energy converter is coupled to a first waveform controller and to a second waveform controller; and,
    wherein in the first operating direction the bi-directional energy converter is configured to receive a first input voltage from said battery and generate a first output voltage;

wherein in a second operating direction the bi-directional energy converter is configured to receive a second input voltage from said electric motor and generate a second output voltage;

wherein the bi-directional energy converter is configured to either increase or decrease the first and second output voltages relative to the first and second input voltages; and wherein the first waveform controller is configured to modify the first output voltage waveform from the bi-directional energy converter to provide a first desired output voltage waveform and wherein the second waveform controller is configured to modify the second output voltage waveform from the bi-directional energy converter to provide a second desired output voltage waveform.

12. The charging system of claim 11 wherein the first and second waveform controllers are configured to modify the output voltages by filtering the output current of the bi-directional energy converter to match the back emf profile of the motor.

13. The charging system of claim 11 wherein:
the first waveform controller is configured to modify the first output voltage based on a comparison of the voltage level of said battery to the voltage level of said electric motor; and
the second waveform controller is configured to modify the second output voltage based on a comparison of the voltage level of the battery to the voltage level of said electric motor.

14. A four quadrant motor drive controller for an electric motor comprising:
a bi-directional energy converter couplable to: a power supply and an electric motor;
a first waveform controller; a second waveform controller;
wherein the bi-directional energy converter is coupled to the first waveform controller and to the second waveform controller, wherein the first waveform controller is couplable to an electric motor and wherein the second waveform controller is couplable to a power supply;
wherein the bi-directional energy converter is configured:
to receive a first input voltage and generate a first output voltage in a first operating direction and receive a second input voltage and generate a second output voltage in a second operating direction;
to operate in a primary mode and secondary mode wherein in the primary mode the bi-directional energy converter is configured to generate the output voltages from the input voltages wherein the output voltages are greater than the input voltages and wherein in the secondary mode the bi-directional energy converter is configured to generate the output voltages from the input voltages wherein the output voltages are less than the input voltages;
wherein in the first operating direction and in primary mode the first waveform controller is configured to modify the first output voltage waveform from the bi-directional energy converter to provide a first desired output voltage waveform;
wherein in the second operating direction and in primary mode the second waveform controller is configured to modify the second output voltage waveform from the bi-directional energy converter to provide a second desired output voltage waveform.

15. The four quadrant motor drive controller of claim 14, wherein in the first operating direction and in the secondary mode, the second waveform controller is configured to modify the first output voltage waveform from the bi-directional energy converter to provide the first desired output voltage waveform at the first input/output terminal, and
wherein in the second operating direction and in the secondary mode the first waveform controller is configured to modify the second output voltage waveform from the bi-directional energy converter to provide the second desired output voltage waveform at the second input/output terminal.

16. The four quadrant motor drive controller of claim 14, wherein the first and second waveform controllers are configured to modify the output voltages by filtering the output current of the bi-directional energy converter to match the back emf profile of the motor.

17. The four quadrant motor drive controller of claim 14, wherein the motor drive controller is further configured to determine a torque demand of the motor and wherein the bi-directional energy converter is configured to operate in either the primary mode or the secondary mode in response to the torque demand of the electric motor.

18. The four quadrant motor drive controller of claim 14, wherein the bi-directional energy converter is configured to operate in either the first operating direction or the second operating direction based on the desired motor operation quadrant.

19. The four quadrant motor drive controller of claim 14, wherein:
the first waveform controller is configured to modify the first output voltage waveform from the bi-directional energy converter based, at least in part, on whether the bi-directional energy converter is operating in either the first direction or second direction; and
the second waveform controller is configured to modify the second output voltage waveform from the bi-directional energy converter based, at least in part, on whether the bi-directional energy converter is operating in either the first direction or second direction.

20. A method of operating a motor coupled to an energy management system, wherein a rotor of the motor is either (i) stationary (ii) accelerating or rotating at constant speed or (iii) decelerating, the method comprising:
in response to determining that the rotor is stationary:
reducing a supply voltage and modifying the supply voltage waveform to the motor to achieve a starting torque or a required starting speed of rotation of the rotor of the motor;
determining that a back emf from the motor is at a certain threshold and increasing and modifying the voltage waveform of the supply voltage to the motor to achieve a desired operating torque or operating speed of rotation of the rotor;
in response to an increased torque demand or required rotor speed:
increasing and modifying the voltage waveform of the supply voltage to the motor to achieve a desired torque or a required speed of rotation of the rotor of the motor;
in response to determining that the rotor is decelerating:
comparing a voltage generated from the motor to the supply voltage;
determining whether to increase or decrease the supply voltage based on the comparison.

* * * * *